(12) United States Patent
Tan et al.

(10) Patent No.: US 10,252,424 B2
(45) Date of Patent: *Apr. 9, 2019

(54) SYSTEMS AND METHODS FOR CONTROL OF ROBOTIC MANIPULATION

(71) Applicant: General Electric Company, Schenectady, NY (US)

(72) Inventors: Huan Tan, Niskayuna, NY (US); John Michael Lizzi, Niskayuna, NY (US); Charles Theurer, Niskayuna, NY (US); Tai-Peng Tian, Niskayuna, NY (US); Balajee Kannan, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/885,289

(22) Filed: Jan. 31, 2018

(65) Prior Publication Data

US 2018/0154525 A1 Jun. 7, 2018

Related U.S. Application Data

(63) Continuation of application No. 14/702,014, filed on May 1, 2015, now Pat. No. 9,889,566.

(51) Int. Cl.
*B25J 9/16* (2006.01)
*B25J 9/06* (2006.01)
(Continued)

(52) U.S. Cl.
CPC ............ *B25J 9/1697* (2013.01); *B25J 5/007* (2013.01); *B25J 9/06* (2013.01); *B25J 13/084* (2013.01);
(Continued)

(58) Field of Classification Search
CPC ........ B25J 13/084; B25J 19/023; B25J 5/007; B25J 9/06; B25J 9/1697; H05K 999/99;
(Continued)

(56) References Cited

U.S. PATENT DOCUMENTS 7,558,634 B2   7/2009  Woergoetter et al.
8,301,318 B2 * 10/2012  Lacaze ................ G05D 1/0206
                                                                701/1
(Continued)

FOREIGN PATENT DOCUMENTS

CN         101726296 A      6/2010

OTHER PUBLICATIONS

Kelly Et At.; "Experimental Validation of Operator Aids for High Speed Vehicle Teleoperation"; 2013; vol. 88 (pp. 951-962).
(Continued)

*Primary Examiner* — Rachid Bendidi
(74) *Attorney, Agent, or Firm* — GE Global Patent Operation; Nitin N. Joshi

(57) ABSTRACT

A robot system and method are provided that move an articulable arm relative to a target object. Perception information corresponding to a position of the arm relative to the target object is acquired. Movement of the arm is controlled based on the perception information. After movement of the arm, predicted position information representative of a predicted positioning of the arm is provided using the perception information and control signal information. The arm is subsequently controlled using the predicted position information.

17 Claims, 4 Drawing Sheets

(51) Int. Cl.
- *B25J 19/02* (2006.01)
- *B25J 5/00* (2006.01)
- *B25J 13/08* (2006.01)

(52) U.S. Cl.
CPC ... *B25J 19/023* (2013.01); *G05B 2219/39391* (2013.01); *G05B 2219/42263* (2013.01); *Y10S 901/09* (2013.01)

(58) Field of Classification Search
CPC .......... G05B 2219/39391; G05B 2219/42263; Y10S 901/09
See application file for complete search history.

(56) References Cited

U.S. PATENT DOCUMENTS

| | | | |
|---|---|---|---|
| 2006/0197486 A1 | 9/2006 | Kubo et al. | |
| 2010/0256814 A1* | 10/2010 | Smith | B25J 13/082 700/259 |
| 2012/0158179 A1* | 6/2012 | Ooga | B25J 9/1633 700/259 |
| 2013/0011018 A1* | 1/2013 | Tateno | G01B 11/002 382/106 |
| 2013/0041508 A1* | 2/2013 | Hu | B25J 9/162 700/259 |
| 2014/0074291 A1* | 3/2014 | Emoto | B25J 9/1664 700/258 |
| 2014/0114477 A1* | 4/2014 | Sato | B25J 9/1664 700/250 |
| 2014/0163730 A1 | 6/2014 | Mian | |
| 2014/0167370 A1 | 6/2014 | Eisenbarth | |

OTHER PUBLICATIONS

Gu et al.; "Neural Predictive Control for a Car-like Mobile Robot", Robotics and Autonomous Systems; , May 2006; vol. 39, Issue 2 (pp. 73-86).

Piovesan et al.;"Randomized Model Predictive Control for Robot Navigation", Proceeding ICRA'09 Proceedings of the 2009 IEEE international conference on Robotics and Automation; 2009 (pp. 1817-1822).

Erez et al.;"An Integrated System for Real-time Model-predictive Control of Humanoid Robots", IEEE/RAS International Conference on Humanoid Robots (Humanoids); 2013 (pp. 1-8).

* cited by examiner

SYSTEMS AND METHODS FOR CONTROL OF ROBOTIC MANIPULATION

RELATED APPLICATIONS

The present application claims priority to, and is a continuation of, U.S. patent application Ser. No. 14/702,014, filed 1 May 2015, and entitled "Systems and Methods for Control of Robotic Manipulation," the subject matter of which is hereby incorporated by reference in its entirety.

BACKGROUND

A variety of tasks may be performed in a rail yard on one or more rail vehicle systems within the yard. For example, between missions performed by a rail vehicle, various systems, such as braking systems, of the units of a rail vehicle may be inspected and/or tested. As one example, a brake bleeding task may be performed on one or more units of a rail vehicle system. In a rail yard, there may be a large number of rail cars in a relatively confined area, resulting in a large number of inspection and/or maintenance tasks. Difficult, dangerous, and/or mundane or repetitive tasks may be performed by robots In some applications, for example where an error of detecting an object with which a robot is to interact is large (e.g., 3-5 centimeters), closed loop control may be implemented. However, for example, application of continuous servo control may generate an over-control problem in applications where the frequency of information acquisition used with the continuous servo control is slower than a frequency of the controller.

BRIEF DESCRIPTION

In one embodiment, a robot system (e.g., a robot system configured to manipulate a target object) is provided that includes an articulable arm, a perception acquisition unit, and at least one processor. The articulable arm is configured to move relative to the target object. The perception acquisition unit is configured to be mounted to the arm and to acquire, at an acquisition rate, perception information corresponding to a position of the arm relative to the target object. The at least one processor is operably coupled to the arm and the perception acquisition unit. The at least one processor is configured to control movement of the arm at a control rate that is at least one of faster than or unsynchronized with the acquisition rate of the perception acquisition unit, provide predicted position information representative of a predicted positioning of the arm using the perception information and control signal information, and control the arm using the perception information and the predicted position information.

In another embodiment, a method for controlling a robot system is provided. The method includes determining a target object toward which a robotic arm is to be directed at a control rate. The method also includes acquiring (via a perception acquisition unit mounted to the arm), at an acquisition rate that is at least one of slower than or unsynchronized with the control rate, perception information corresponding to a position of the arm relative to the target object. Also, the method includes generating, with at least one processor operably coupled to the perception acquisition unit and the arm, predicted position information representative of a predicted positioning of the arm using the perception information and control signal information. Further, the method includes controlling, with the at least one processor, the arm to move toward the target object using the perception information and the predicted position information.

In another embodiment, a tangible and non-transitory computer readable medium is provided. The tangible and non-transitory computer readable medium includes one or more computer software modules. The one or more computer software modules are configured to direct one or more processors to determine a target object toward which a robotic arm is to be directed at a control rate, to acquire, via a perception acquisition unit mounted to the arm, at an acquisition rate that is at least one of slower than or unsynchronized with the control rate, perception information corresponding to a position of the arm relative to the target object, to provide predicted position information representative of a predicted positioning of the arm using the perception information and control signal information, and to control the arm to move toward the target object using the perception information and the predicted position information.

DETAILED DESCRIPTION

Figure 1:
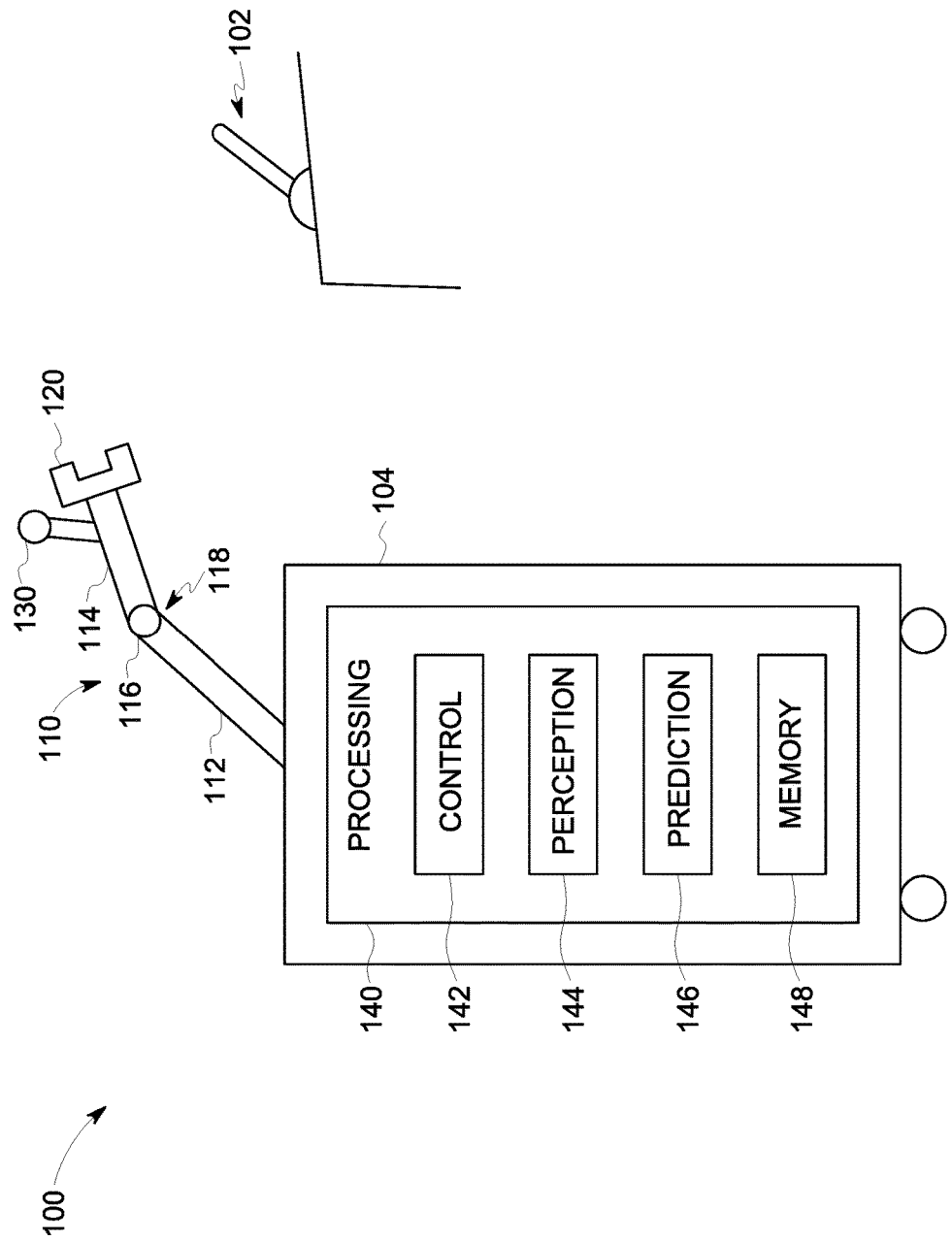
FIG. 1 is a schematic block diagram of a robotic system in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide methods and systems for control of robotic systems. For example, various embodiments provide for control of a robot to approach and/or interact with a target object. In some embodiment, the robotic systems are controlled to grasp a lever, such as a lever to perform a brake bleeding operation. In various embodiments, perception information corresponding to a position of a target object is obtained at a rate that is slower than a control rate, and a predictive motion model is used to estimate a position of a target object between acquisitions of perception information, with the estimation result used in a stepwise closed loop control mechanism to synchronize perception and motion control, and to increase system precision.

At least one technical effect of various embodiments includes improving control (e.g., continuous servo control) reliability, accuracy, and/or precision for robotic systems. At least one technical effect of various embodiments is the improvement of robotic control for systems having higher control rates than acquisition rates (e.g., acquisition rates for perception information from a camera or three dimensional (3D) sensor). At least one technical effect of various embodiments is the improvement of robotic control for systems having control rates that are not synchronized with acquisition rates. At least one technical effect of various embodiments is the elimination or reduction of issues related to over-control of robotic systems. At least one technical effect of various embodiments includes maintaining a highest available response rate of a system (for example, the highest rate of major modules of a control system, such as a rate of an actuation module).

FIG. 1 is a schematic view of a robot system 100 in accordance with various embodiments. The robot system 100 is configured to manipulate (e.g., one or more of grasp, contact, actuate, or otherwise engage) a target object 102. For example, the target object 102 may be a lever which the robot system 100 is configured to grasp and actuate. In some embodiments, the target object 102 may be a brake bleed lever of a rail car. As seen in FIG. 1, the depicted robot system 100 includes an articulable arm 110, a manipulator unit 120, a perception acquisition unit 130, and a processing unit 140. Generally, the processing unit 140 (e.g., a control portion of the processing unit 140) acts to control the operation of the robot system 100, including the movement of the arm 110.

In the illustrated embodiment, the arm 110 is articulable and configured to move toward the target object 102 (e.g., based upon instructions or control signals from the processing unit 140). The depicted manipulator unit 120 is mounted proximate an end of the arm 110 and is configured to grasp the target object 102. As seen in FIG. 1, the perception acquisition unit 130 of the illustrated embodiment is mounted to the arm (e.g., proximate an end of the arm 110 with the manipulator unit 120 attached thereto). The perception acquisition unit 130 is configured to acquire perception information at an acquisition rate. In the illustrated embodiment, the perception information corresponds to a position of the arm 110 relative to the target object 102. For example, the perception information may define, depict, or otherwise correspond to a difference in the positions of the manipulator unit 120 (or a portion thereof) or an end of the arm to which the manipulator unit 120 is mounted and the target object 102 (or a portion thereof). For example, the distance between a grasping portion of the manipulator unit 120 and a portion of the target object 102 to be grasped may be described by the perception information.

The processing unit 140 is operably coupled to the arm 110 (e.g., to control movement of the arm 110) and the perception acquisition unit 130 (e.g., to receive perception information from the perception acquisition unit 130). The processing unit 140 is configured to control movement of the arm 110 at a control rate that is at least one of faster than or unsynchronized with the acquisition rate of the perception acquisition unit 130. For example, the control rate may be between 10-100 Hz, and the acquisition rate may be 1 Hz. The processing unit 140 is also configured to predict positioning of the arm 110 to provide predicted position information using the perception information and control signal information (e.g., information describing, depicting, or corresponding to a direction and/or velocity of a control instruction provided to the arm subsequent to a time corresponding to acquisition of perception information or other determination of a previous position of the arm 110). The processing unit 140 in the illustrated embodiment is also configured to control the arm using the perception information and the predicted position information. The predicted position information may be determined at the control rate and used for modifying subsequent control instructions. In the illustrated embodiment, the processing unit 140 utilizes the predicted position information for feedback and control of the arm 110 between acquisitions of perception information, thereby utilizing predicted position information when current perception information is not available, and utilizing perception information for reliability and accuracy when current perception information is available. As used herein, perception information may be understood as being current when a subsequent control action has not been implemented since the acquisition of the perception information. As seen in FIG. 1, the robot system 100 includes a base or body 104 from which the arm 110 extends. In various embodiments, the robot system 100 (e.g., the body 104) may have wheels, tracks, or the like, along with a propulsion system (e.g., motor) for mobility.

The depicted arm 110 includes a first portion 112 and a second portion 114 joined by a joint 116. The first portion 112 extends from the body 104 and is articulable with respect to the body 104, and the first portion 112 and second portion 114 are articulable with respect to each other. The motion of the arm 110 (e.g., the first portion 112 and the second portion 114) may be actuated via associated motors that receive control signals provided by the processing unit 140. It may be noted that only two portions are shown in the illustrated embodiment for ease of illustration; however, arms having more portions and joints may be utilized in various embodiments. The depicted arm 110 also includes a sensor 118 configured to sense or detect position and/or motion of the arm 110 (or portions thereof) at the joint to provide feedback to the processing unit 140.

In the illustrated embodiment, the manipulator unit 120 is configured to grasp the target object 102. The manipulator unit 120 may include one or more sensors for detecting contact with the target object 102 and/or for providing feedback during grasping of the target object 102. As seen in FIG. 1, the depicted manipulator unit 120 is mounted at an end of the arm 110. While the depicted manipulator unit 120 is configured to grasp an item, additional or alternative tasks may be performed by the manipulator unit 120 in various embodiments. For example, in the illustrated embodiment, the arm 110 and manipulator unit 120 are configured to grasp and actuate a lever (e.g., a lever from brake bleeding of a rail car); however, in other embodiments, the arm 110 and manipulator unit 120 may additionally or alternatively be configured to perform other tasks, such as inspection or maintenance tasks. In various embodiments, the manipulator unit 120 may include one or more arms, hinges, linkages, or other mechanisms to control the position of one or more grippers, holders, cameras, or other devices. In various embodiments, the manipulator unit 120 may include one or more motors, gears, cylinders, or the like to actuate a mechanism based on control signals or commands provided by the processing unit 140. The manipulator unit 120 may be hydraulically, electrically, or otherwise actuated. For example, the manipulator unit 120 may be configured to grasp and manipulate an item, for example to release a brake, actuate a switch, secure (or release) a latch or fastener, position and hold a part or tool for use in maintenance and inspection of a rail car, load a part or tool to be transported on to the robot system 100 (or off-load the tool or part from the robot system 100), or the like. Alternatively or additionally, the manipulator unit 120 may be used to position a device used to collect information. For example, the manipulator unit 120 may position an inspection camera in a difficult to reach area (e.g., underneath a rail car), with information from the camera used for inspection or diagnostic purposes.

The perception acquisition unit 130 is mounted to the arm 110 and configured to acquire perception information corresponding to a position of the arm 110 to the target object 102 at an acquisition rate. An acquisition rate may be understood as a rate at which distinct sets of imaging information (e.g., images, frames) may be acquired. For example, the perception acquisition unit 130 may acquire images or imaging information at a rate of 1 frame per second, or 1 Hz. In the illustrated embodiment, the perception acquisition unit 130 is mounted to the arm 110 proximate the end of the arm 110 to which the manipulator unit 120 is joined (e.g., at a "wrist" position). The depicted perception acquisition unit 130 acquires perception information regarding location of the target object 102 relative to a position of the arm 110 (e.g., a distance from a portion of the target object 102 to be grasped to the manipulator unit 120 mounted on the arm 110). In various embodiments, the perception acquisition unit 130 may include one or more of a camera, stereo camera, or laser sensor.

The depicted processing unit 140 is operably coupled to the arm 110 and the perception acquisition unit 130. For example, the processing unit 140 may provide control signals to and receive feedback signals from the arm 110, and may receive perception information from the perception acquisition unit 130. In the illustrated embodiment, the processing unit 140 is disposed onboard the robot system 100 (e.g., on-board the base or body 104); however, in some embodiments the processing unit 140 or a portion thereof may be located off-board. For example, all or a portion of the robot system 100 may be controlled wirelessly by a remote controller. The processing unit 140 may also be operably coupled to an input unit (not shown) configured to allow an operator to provide information to the robot system 100, for example to identify or describe a task to be performed. As used herein, a control rate may be understood, for example, as a rate at which distinct control signals or commands may be determined, provided, and executed.

The depicted processing unit 140 is also configured to predict or estimate positioning of the arm 110 to provide predicted position information using the perception information and control signal information. In some embodiments, the predicted or estimated position of the arm 110 at a given (e.g., current) time may be determined based on a previous position of the arm at an initial time, velocity information corresponding to a velocity of the arm between the initial time and the current time, and the amount of time elapsed between the initial time and the current time. For example, at an initial time, the arm 110 (and/or manipulator unit 120) may be at a known position relative to the target object 102 (e.g., based on a known starting position or via use of perception information obtained via the perception acquisition unit 130). The arm 110 may be provided with a control signal causing the arm 110 to move. The control signal may specify velocity information, such as both a magnitude and direction of velocity (e.g., a command specifying for one portion of the arm to move at a specified speed in a specified direction). In some embodiments, the velocity information may also include an acceleration (or rate of change of velocity over time) for a movement to be performed.

Based on the velocity information and the amount of time elapsed, the processing unit 140 may predict a position of the arm 110 by modifying the initially determined position based on the velocity information. For example, in one illustrative scenario of one-dimensional motion, the manipulator unit 120 starts at a position of x=0 at an initial time of 0 (where x represents the position along a single direction or axis). A control signal is provided to the arm 110 to actuate the manipulator unit in a positive x-direction at one inch per second. At a subsequent time of 1 second, the processing unit 140 may determine an estimated or predicted position to be at x=1 inch or about 2.5 centimeters (or the initial position of 0 plus the velocity (1 inch/second) or (about 2.5 centimeters/second) times the time elapsed (1 second)). In practice other increments and velocities may be used, acceleration may be utilized and accounted for, and movement may be in one or more additional dimensions. The depicted processing unit 140 is also configured to control the arm 110 using the perception information and the predicted position information. For example, the arm 110 may be controlled using perception information at various points during performance of a task, while using the predicted position information at other points during performance of the task (e.g., at points at which predicted position information is available but current or reliable perception information is not available). Accordingly, various embodiments provide for a faster rate of control or adjustment than otherwise available for a given acquisition rate, while avoiding or minimizing over-control issues.

In various embodiments, the processing unit 140 is configured to control the arm using the predicted position information for a first interval corresponding to the control rate, and to control the arm using the perception information for a second interval corresponding to the acquisition rate. For example, a given interval may be the inverse of the corresponding rate. It may be noted that control using a type of information for an interval does not necessarily mean that the type of information is used over the entire interval. For example, the interval may be understood as the time elapsed for which a control action based on the particular type of information may be changed. For instance, predicted position information may be used during a portion of an acquisition interval where current perception information is not available. In various embodiments, use of perception information may be given preference over use of predicted information. In some embodiments, the processing unit 140 may determine predicted or estimated position information only when current perception information is not available.

Figure 2:
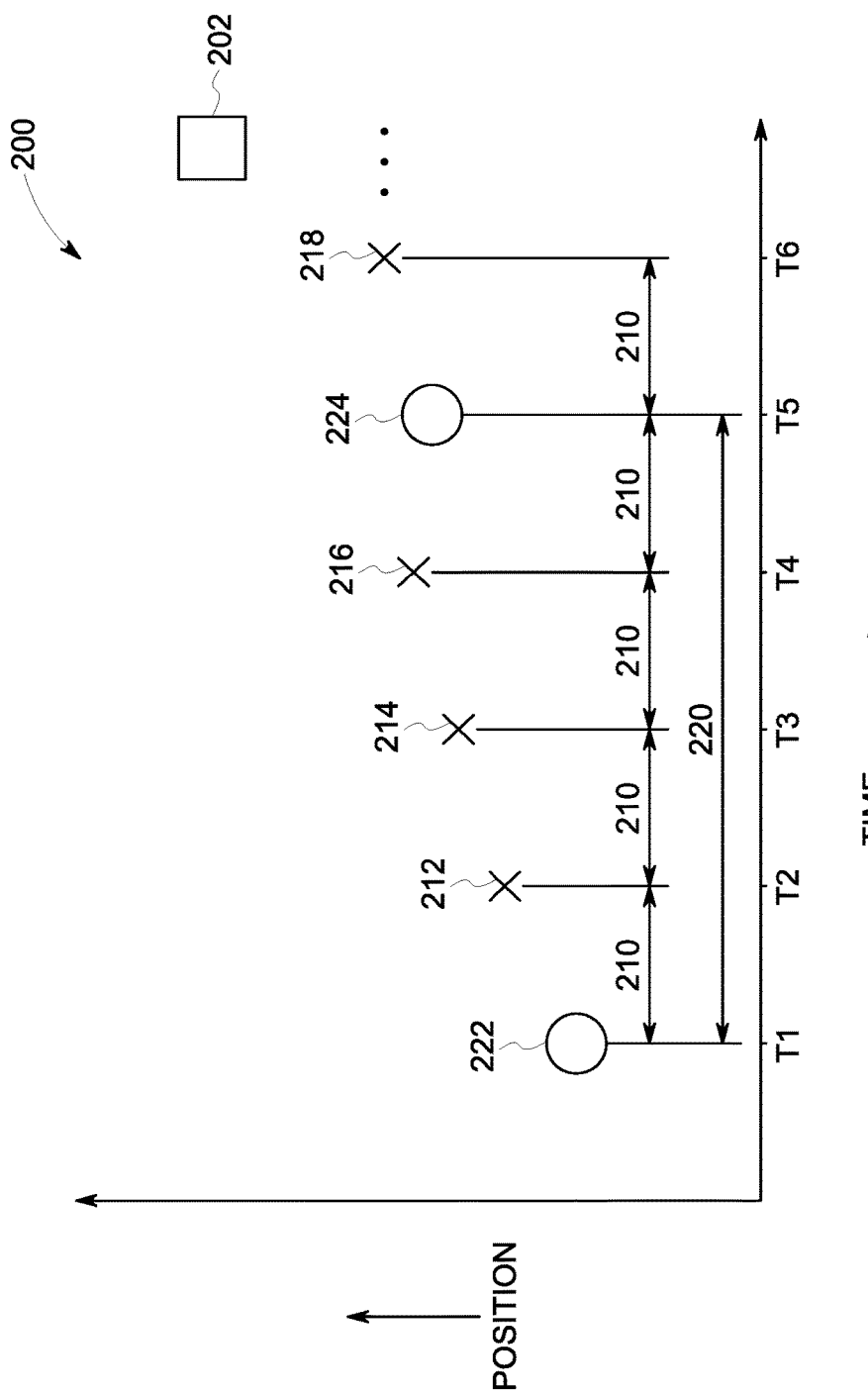
FIG. 2 is a graph depicting control operations in accordance with various embodiments.

FIG. 2 illustrates a graph 200 depicting position of an arm (e.g., a portion thereof) over time. The graph 200 is only for a single positional dimension for ease of illustration. It may be noted that movement in 2 or 3 dimensions may be employed, perceived or detected, and predicted in various embodiments. The graph 200 depicts predicted positions 212, 214, 216, and 218, each spaced at a control interval 210 from an immediately preceding position (either perception or predicted), as well as perception positions 222 and 224 spaced apart at a perception interval of 220. With the control rate faster than the perception rate, the control interval 210 is shorter than the perception interval 220. For the example scenario depicted in FIG. 2, the arm is being controlled to move toward a desired position 202. The desired position is indicated by a square, positions identified by perception information are indicated by circles, and position estimated or predicted using control signal information are indicated by X's.

In an example scenario, the arm starts at a position 222 at an initial time T1 that is determined using information from a perception acquisition unit. As the position 222 is below the desired position 202, a control signal is provided to the arm to actuate the arm in a positive direction and toward the desired position 202. Once the arm starts moving, the previously perceived position 222 is no longer current. Because the control rate is faster than the acquisition rate, a control instruction may be provided or modified before updated acquisition information is available.

Accordingly, in the example scenario, a predicted position 212 is determined at time T2. The predicted position 212 is based on the position 222 modified by the velocity called for by the control signal provided based on the position 222 over the elapsed time between T1 and T2. As the position 212 is below the desired position 202, a control signal is next provided to the arm to actuate the arm in a positive direction and toward the desired position 202.

At time T3, current acquisition information is still not available, so a predicted position 214 is determined at time T3, and used to control the arm between times T3 and T4. The predicted position 214 is based on the position 212 modified by the velocity called for by the control signal provided based on the position 212 over the elapsed time between T2 and T3. As the position 214 is still below the desired position 202, another control signal is next provided to the arm to actuate the arm in a positive direction and toward the desired position 202.

Also, at time T4 of the example scenario, current acquisition information is not available. Accordingly, a predicted position 216 is determined at time T4, and used to control the arm between times T4 and T5. The predicted position 216 is based on the predicted position 214 (at T3) modified by the velocity called for by the control signal provided based on the position 214 over the elapsed time between T3 and T4. As the position 216 is still below the desired position 202, another control signal is next provided to the arm to actuate the arm in a positive direction and toward the desired position 202.

At time T5, current acquisition information is available once again, and is used to determine the position 224. As the position 224 is still below the desired position 202, a control signal is again provided to the arm to actuate the arm in a positive direction and toward the desired position 202 between times T5 and T6. Once the arm starts moving, the previously perceived position 224 is no longer current. Accordingly, a predicted position 218 is determined at time T6. The predicted position 218 is based on the position 224 modified by the velocity called for by the control signal provided based on the position 224 over the elapsed time between T5 and T6. As the position 218 is below the desired position 202, another control signal is next provided to the arm to actuate the arm in a positive direction and toward the desired position 202. The process may be continued until the arm is at the desired position 202.

It should be noted that the above discussed example of FIG. 2 is provided by way of example for illustrative purposes. In various embodiments, different numbers of predictive cycles may occur between acquisition cycles (for example, in the illustrated embodiment, the control rate is 4 times faster than the perception or acquisition rate; however, in other embodiments the control rate may be 2 times faster than the perception or acquisition rate, 5 times faster, or 10 times faster, among others). Further, it may be noted that, while the example of FIG. 2 is depicted in terms of a single positional dimension over time, other embodiments may control movements in additional dimensions (e.g., three dimensions). As shown by the above discussion, various embodiments employ predicted positions as an estimate of position when current or reliable perception information is not available, and benefit from the accuracy and/or reliability of perception information when perception information is available.

Thus, in various embodiments, the processing unit 140 is configured to control the arm over a series of plural first intervals (e.g., control interval 210) during at least one second interval (e.g., perception interval 220). In the embodiment depicted in FIG. 2, the control rate (or predictive rate) is four times faster than the perception rate (or acquisition rate), so 3 predicted positions are determined or estimated and used to control the arm before a new, updated, or current perceived position is available. Again, it may be noted that other rates or relative durations of intervals may be employed in various embodiments.

Returning to FIG. 1, the depicted processing unit 140 includes a control module 142, a perception module 144, a prediction module 146, and a memory 148. It may be noted that the particular units or modules shown in FIG. 1 are meant by way of example, and that other arrangements of units or sub-units of the processing unit 140 may be employed in various embodiments, and that other types, numbers, or combinations of modules may be employed in alternate embodiments, and/or various aspects of modules described herein may be utilized in connection with different modules additionally or alternatively. Generally, the various aspects of the processing unit 140 act individually or cooperatively with other aspects to perform one or more aspects of the methods, steps, or processes discussed herein. The processing unit 140 may include processing circuitry configured to perform one or more tasks, functions, or steps discussed herein. It may be noted that "processing unit" as used herein is not intended to necessarily be limited to a single processor or computer. For example, the processing unit 140 may include multiple processors and/or computers, which may be integrated in a common housing or unit, or which may distributed among various units or housings.

The depicted control module 142 uses inputs from the perception module 144 and the prediction module 146 to control movement of the arm 110 based on a location of arm 110 relative to the target object 102 (e.g., based on a difference between a perceived distance between the arm 110 and the target object 102 when perception information is available, and based on a predicted difference when perception information is not available). The control module 142 is configured to provide control signals to the arm 110 (e.g., to one or more motors or other actuators associated with one or more portions of the arm 110), and also to control the manipulator unit 120 once the target object 102 has been reached by the manipulator unit 130. Additionally, the depicted control module 142 also provides, to the prediction module 146, control signal information describing or corresponding to control signals provided to the arm 110, for use by the prediction module 146 in estimating position when perception information is not available.

The depicted perception module 144 is configured to acquire acquisition information from the perception acquisition unit 130, and to determine a location of the arm 110 (e.g., a position of a portion of the arm 110 or component associated therewith such as the manipulator unit 120 relative to the target object 102). The perception module 144 in the illustrated embodiment provides information to the control module corresponding to the location of the arm 110 determined by the perception module 144 using information from the perception acquisition unit 130.

The depicted prediction module 146 is configured to predict positioning of the arm 110 to provide predicted position information using perception information from the perception module 144 (and/or perception acquisition unit 130) and control signal information from the control module 142. Generally, in various embodiments, the prediction module 146 uses a previous position and corresponding control signal information (e.g., velocity and direction of the arm resulting from a control signal over elapsed time since implementation of control signal) to predict a subsequent position. For example, the prediction module 146 may modify a previously determined position (either determined using perception information or from a previous prediction) by an amount corresponding to a velocity of the arm 110 (or portion thereof) corresponding to a control signal (e.g., a magnitude and direction of velocity) provided subsequent to the previously determined position. In various embodiments, acceleration or change in velocity may be present and accounted for.

The memory 148 may include one or more tangible and non-transitory computer readable storage media. The memory 148, for example, may be used to store information corresponding to a task to be performed, a target object, control information (e.g., current and/or recently used control signals and/or movements corresponding thereto) used to predict position, or the like. Further, the process flows and/or flowcharts discussed herein (or aspects thereof) may represent one or more sets of instructions that are stored in the memory 148 for direction of operations of the robot system 100.

It may be noted that the robot system 100 may include additional aspects not expressly depicted in FIG. 1. For example, the robot system 100 may also include a propulsion unit configured to move the robot system 100 between different locations, and/or a communication unit configured to allow the robot system 100 to communicate with a remote user, a central scheduling or dispatching system, or other robot systems, among others.

Figure 3:
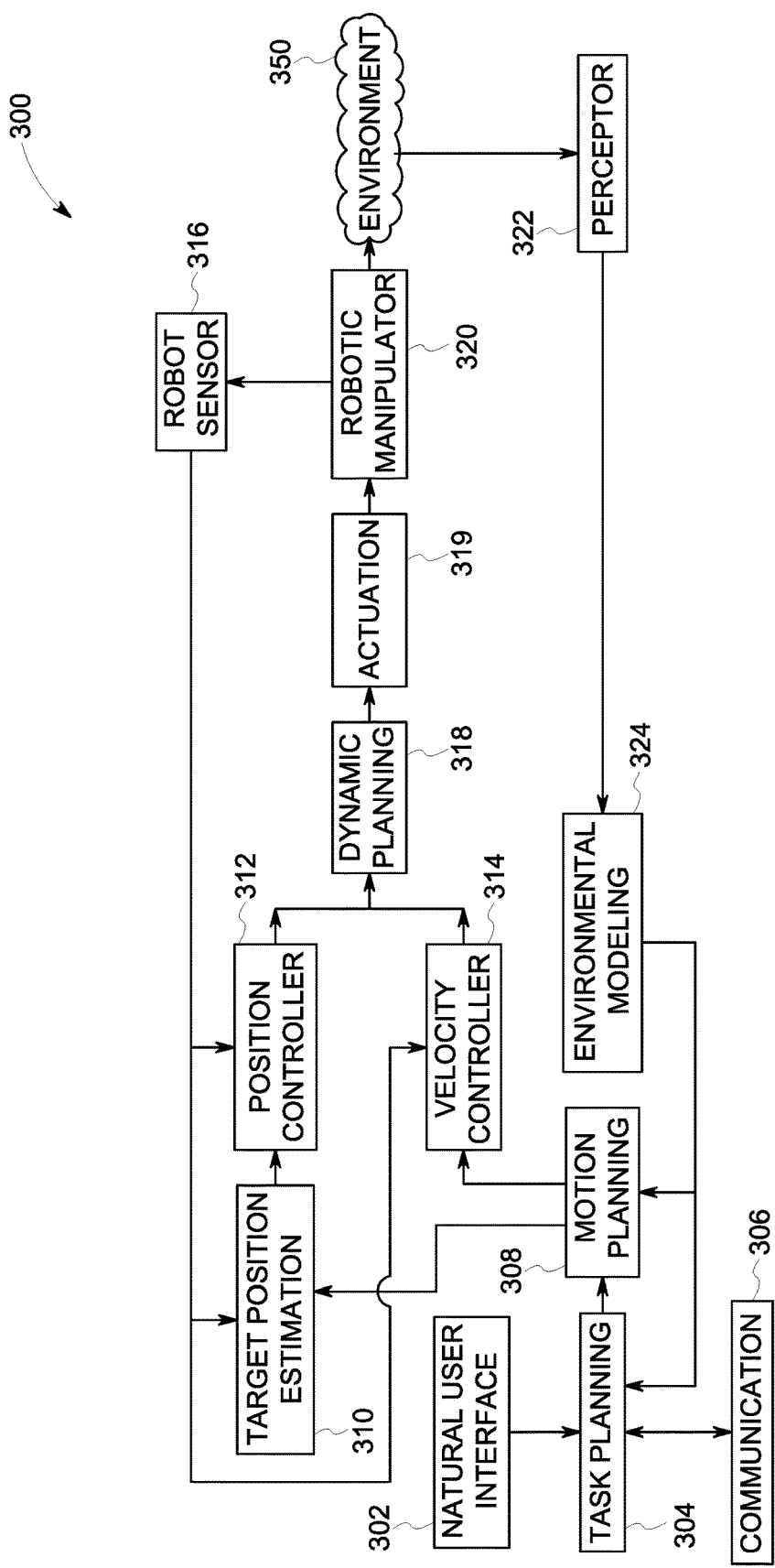
FIG. 3 is a schematic block diagram of a robotic control system in accordance with various embodiments.

FIG. 3 is a schematic block diagram of a robotic control system 300 in accordance with various embodiments. As seen in FIG. 3, the depicted robotic control system 300 is configured for use with an environment 350. The environment 350, for example, may include one or more target objects or locations corresponding to one or more tasks to be performed by a robot system controlled by the robotic control system 300. The robotic control system 300 of the illustrated embodiment includes a user interface 302, a task planning block 304, a communication block 306, a motion planning block 308, a target position estimation block 310, a position controller 312, a velocity controller 314, a robot sensor 316, a dynamic planning block 318, an actuation block 319, a robotic manipulator 320, a perceptor block 322, and an environmental modeling block 324. Aspects of the robotic control system 300 may be employed with the robot system 100 depicted in FIG. 1 (e.g., various blocks of the of the control system 300 may be employed as part of or in conjunction with the processing unit 140). Generally, the core components of the robotic control system 300 are planning modules and controllers. Given a task received either via the user interface 302, or the communication block 306 which communicably couples the robotic control system 300 with one or more other systems, the robotic control system 300 may plan tasks by scheduling task primitives to perform the designated task.

For example, each scheduled task primitive may trigger the motion planning block 308 to generate a motion trajectory, which may include descriptions of position, velocity, and acceleration values of all the via-points, and may incorporate environmental modeling results. In various embodiments, a dual closed loop control system is used to drive the robotic manipulator 320 through all of the via-points with desired dynamic motions. The dual closed loop control system may include a position loop and a velocity loop. The position controller 312 in the illustrated embodiment is closed-loop-based, with feedback information obtained from both the robot being controlled and the environment (e.g., the task space). The depicted velocity controller 314 is also closed-loop-based, but does not receive information from environmental perceptors. From that point of view, the velocity controller 314 may be considered as an "open loop" system, because the feedback information is not obtained from the task space. Computed motion information is sent to the dynamic planning block 318 to generate joint torques to drive the motion of the robotic manipulator. For example, the actuation block 319 may provide necessary input for the robotic manipulator 320 based on computing results from the dynamic planning block 318. Environmental information is sent to the planning modules for higher level one-time planning. Task validation may also be performed at the task planning block 304 using environmental information. Various example hardware and/or algorithms related to certain blocks or aspects of the robotic control system 300 will next be discussed.

The robotic manipulator 320 may include one or more articulated arms. For example, in some embodiment, the robotic manipulator may utilize a robot such as a SIA20F of Yaskawa Motoman Robotics. The SIA20F is a 7-axis single-arm robot for automating operations such as assembly, inspection, machine tending, and handling. For example, in a brake bleeding application, a 15 kilogram payload may be handled, with the robotic manipulator 320 mounted on a mobile base for mobile manipulation. A reaching range of at least 800 millimeters with a repeatable error of less than +/−2 millimeters may be required for performing a brake bleeding task. The SIA20F may be utilized for such an application, as it has 7 degrees of freedom, a specified payload of 20 kilograms, a 910 millimeter maximum reach with +/−0.1 millimeter repeatability, and a relatively light weight of 100 kilograms. It may be noted that additional or alternative manipulators may be employed in various embodiments.

The robot sensor 316 may include one or more encoders disposed on a joint (or joints) of a robot arm. In some embodiments, a rotary/linear encoder may be used to convert rotary/linear position to an analog or digital electronic signal. Using encoder values and forward kinematics, the current kinematic status of the robotic manipulator 320 may be computed, including position, velocity, and acceleration. In some embodiments, to help reduce accumulated drift or associated errors, absolute encoders may be utilized.

In some embodiments, a force-sensing resistor may be utilized for detection of forces and torques. A force-sensing resistor may include a material whose resistance changes when a force or pressure is applied, and corresponding electrical signals are generated. In some embodiments, one more ATI Gamma F/T sensors may be employed. The ATI Gamma F/T sensor is a 6-axis sensor with high precision, with a range of measured forces and torques that satisfy the requirement for a brake bleeding application. For example, the ATI Gamma F/T sensor may have a maximum force of 130 newton (N) with resolution of $\frac{1}{40}$ N in the X and Y directions, a maximum force of 400 N with resolution of $\frac{1}{20}$ N in the Z direction, and a maximum torque in the X, Y, and Z directions of 10 N-meter with $\frac{1}{800}$ N-meter resolution.

The perceptor block 322 may be generally similar in certain respects to the perception acquisition unit 120 discussed herein. The perceptor block 322 may include, for example, a three-dimensional range sensor that returns range values that measure distances between the sensor and one or more points detected in the environment 350 (e.g., one or more target objects or portions thereof). Alternatively or additionally, the perceptor block 322 may include a stereo camera that detects a target object (e.g., brake lever) in the environment 350 and estimates a 6-dimensional pose of the target object.

In various embodiments, an end-effector may be employed for error tolerance. For example, errors may be generated from motion control and/or object detection. In some embodiments, an end-effector may be configured to tolerate errors of 5 centimeters or more on all axes.

The depicted task planning block 304 is configured to receive a task as an input (e.g., from the user interface 302 and/or the communication block 306) and to provide task primitives as an output. Task planning, as used herein, may refer to scheduling a sequence or multiple parallel sequences of tasks for a robot to perform. The task planning block 304 may utilize modern control architecture, such as Task-Based Reactive Control (TBRC), may be used to formulate a control problem as a constrained minimization of task errors, and may efficiently exploit the redundancy of platforms provided in various embodiments. It may be noted that inverse TBRC and Cost Optimization may be utilized to plan the task in order to achieve certain task targets, if the goal of the tasks is considered, to achieve a final state of a control algorithm. In some embodiments, the planning for a typical brake bleeding task is a typical single task-based planning problem with several requirements.

The environmental modeling block 324 may employ point cloud-based techniques. As used herein, environmental modeling may refer to describing a working space of a robot. Different modeling methods may be employed depending on the various requirements of different tasks. Generally, environmental modeling is performed to help robots understand the environment in a way related to a task to be performed. The environmental modeling block 324 in various embodiments receives sensory perception information as an input and provides target position as an output. Due to environmental limitations, high precision in the perception aspects of various embodiments is generally desirable. A point cloud-based method may be utilized to find the location of a target point, while other methods may be employed to segment a target object.

Motion trajectory planning (e.g., performed by the motion planning block 308) in various embodiments may utilize an artificial potential field. Motion trajectory planning may be utilized to determine a smooth and collision-free motion trajectory in the working space for a robot to perform one or more tasks. A generated motion trajectory may be represented, for example, as a sequence of via-points with temporal information and motion information, including position, velocity, and acceleration. The motion planning block 308 may receive target position(s) and obstacle position(s) as an input, and provide a desired position of a next timing step as an output. In some embodiments, a robot's configuration may be treated as appoint in an artificial potential field that combines attraction to the goal, and repulsion from obstacles. The resulting trajectory is output as the path. An advantage of this approach is that the trajectory may be produced with little computation. However, it may be noted that the trajectory may potentially become trapped in local minima of the potential field and fail to find a path. It may be noted that in a closed loop approach, the target position and the obstacles are updated continuously.

The target position estimation block 310 in various embodiments may utilize an extended Kalman filter. It may be noted that, since the frequency of the perception information acquisition in various embodiments is significantly slower than the control frequency, the target position with respect to the robot frame may be estimated in various embodiments using a motion model. Then, in each loop, the estimated target position may be used as a desired reference input for the control algorithm. The target position estimation block 310 may receive motion of the manipulator and estimated target position of the last detection result from the perceptor block 322 as an input, and output an estimated target position. Kalman filtering uses a series of measurements observed over time, containing noise (random variations) and other inaccuracies, and produces estimates of unknown variables that tend to be more precise than those based on a single measurement alone. A Kalman filter may operate recursively on streams of noisy input data to produce a statistically optimal estimate of the underlying system state.

After a desired motion trajectory is generated, the depicted position controller 312 uses a control algorithm to minimize the error between the desired position and the actual positions of the via-points. The position controller 312 receives a desired position at a next timing step as an input and provides a driving step as an output. In various embodiments, a proportional-integral-derivative (PID) controller may be employed. A PID controller is a control loop feedback mechanism widely used in industrial control systems. A PID controller calculates an error value as the difference between a measured process variable and desired setpoint. The controller attempts to minimize the error by adjusting the process through use of a manipulated variable.

The depicted velocity controller 314 may include two parts in some embodiments. The first part is an outer loop that may be developed by users, and the second part is an on-board velocity controller. The user developed velocity controller takes the actual position and the updated target position as an input to compute an error, and then generates a compensation signal for the on-board velocity controller, which enables the robot to control its velocity to reduce the computed error. The input to the first part may be a desired velocity, and the output from the first part may be a velocity compensation signal. The input to the second part may be the velocity compensation signal, and the output from the second part may be a velocity driving signal.

In the illustrated embodiment, the dynamic planning block 318 may utilize hybrid motion and force planning. Generally, dynamic planning involves the conversion of motions into torques on joins using a robotics dynamics model. Use of dynamic planning provides more robust, precise, and flexible control of a robotic manipulator. Currently, many commercially available robots already have dynamic control. The depicted dynamic planning block 318 may receive desired via-points with position, velocity, and acceleration as an input, and provide torques to be provided on joints of a robotic arm as an output. In a hybrid motion and force planning component, the forces are defined and treated separately in the joint space and the task space. This approach plans the motion and force simultaneously by taking the desired motion and forces both in task space and joint space into consideration. The outcome of the planning helps provide optimized result in both the task and joint space.

Generally, the communication block 306 is configured to receive information from other components and to send out status information to other components through one or more communication platforms and/or protocols. In some embodiments, wireless communication based on the Transmission Control Protocol (TCP) may be implemented to realize mobile manipulation and help ensure robust and stable data transmission.

In various embodiments, the user interface 302 may provide a graphical user interface provided to one or more users. Generally, a user interface may be utilized to provide a method for users to observe the status information of the robot and/or control the robot using various controls or commands. For example, in a brake bleeding task, a graphical user interface (GUI) may be used to provide a visual way for human user to observe robot status and use buttons (or other input features) to control a robot.

Figure 4:
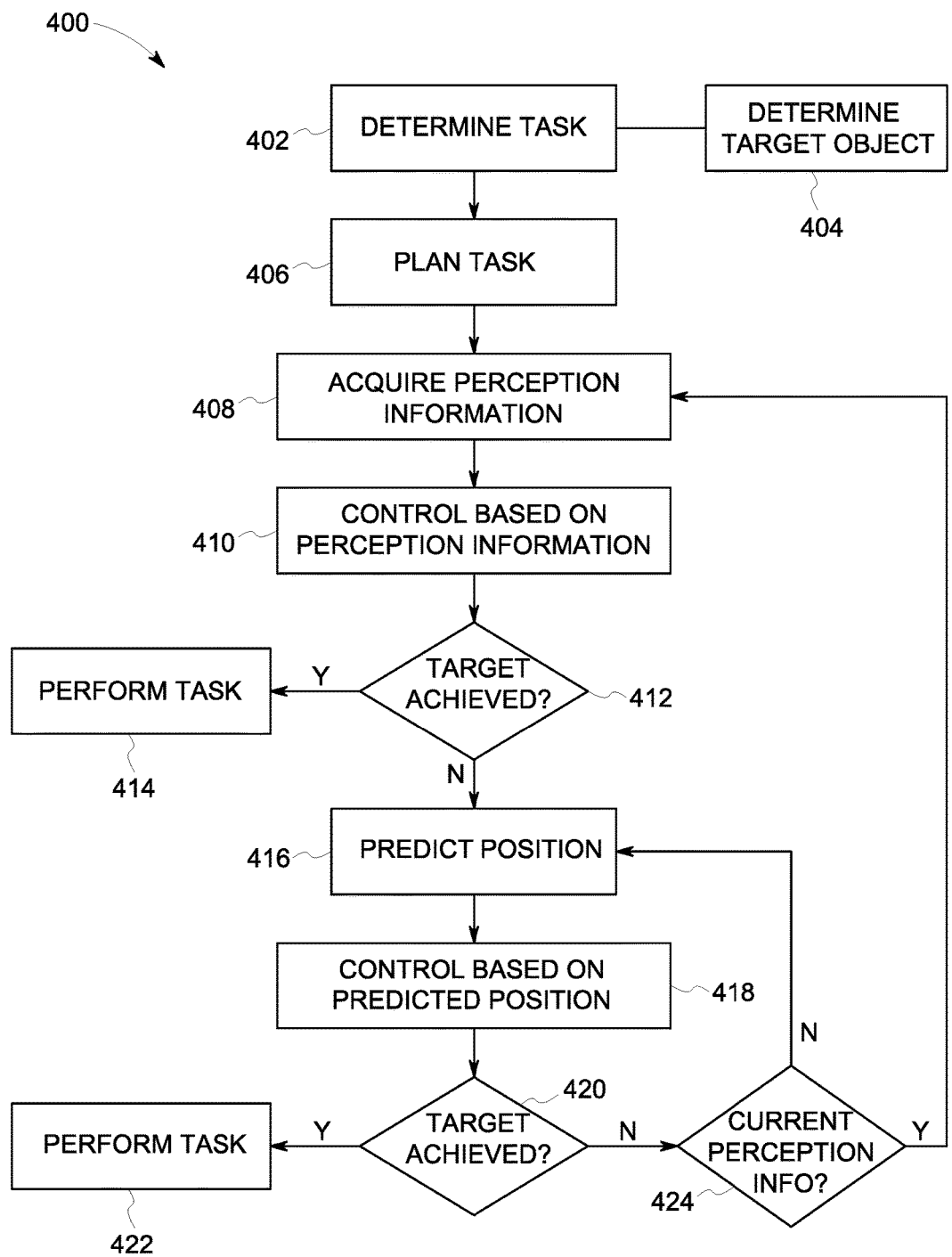
FIG. 4 is a flowchart of a method for controlling a robot in accordance with various embodiments.

FIG. 4 provides a flowchart of a method 400 for controlling a robot, for example a robot for use in a brake bleeding task. In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware to perform operations described herein.

At 402, a task is determined. For example, a task may be entered at a user interface, or otherwise obtained by a system for controlling a robot (e.g., a robot having an articulated arm). For example, the task may be a brake bleeding task in which a robot is to grasp and actuate a lever. As part of, or subsequent to, task determination, one or more target objects (e.g., a lever to be actuated or a portion thereof) is determined. In the illustrated embodiment, at 404, a target object toward which a robotic arm is to be directed is determined. The robotic arm is controlled at a control rate as it is directed toward the target object. The target object, for example, may be a lever that is to be grasped and actuated as part of a brake bleeding task.

At 406, the task is planned. For example, motions and/or forces (e.g., positions, velocities, accelerations, and/or torques on one or more joints at various points during task performance) are planned to achieve the task. As discussed herein, in various embodiments, hybrid motion and force planning may be employed, providing torques on joints of a robotic arm based on desired via-points with position, velocity, and acceleration.

At 408, perception information is acquired. Also, a position may be determined based on the acquired perception information. In various embodiments, the perception information corresponds to a position of the arm relative to the target object. The perception information may be acquired via a perception acquisition unit mounted to arm. The perception acquisition unit, for example, may include one or more of a camera, a stereo camera, and/or a 3-dimensional sensor. In the illustrated embodiment, the perception information is acquired at an acquisition rate that is lower than the control rate at which the robotic arm is controlled.

At 410, the robotic system is controlled based on perception information (e.g., based on a position determined using the perception information acquired at 408). For example, in the illustrated embodiment, the arm is controlled to move closer to the target object. The arm may be controlled based on a difference between the position of the arm as determined using perception information from the perception acquisition unit and a desired position corresponding to the target object.

At 412, it is determined if the target location has been achieved. If the target location has been achieved, the method 400 proceeds to 414. At 414, the task is performed (e.g., the lever is grasped and actuated). If the target location has not been achieved, the method 400 proceeds to 416.

At 416, positioning of the arm is predicted to provide predicted position information. For example, the positioning of the arm in the illustrated embodiment may be predicted or estimated using the perception information (e.g., information obtained at 408) and control signal information. The position perceived at 408 may be modified by a motion called for by a control signal provided at 410 to control the arm to determine the estimated position. For example, a predicted position of the arm may be determined at a current time using a previous position of the arm at an initial time, velocity information corresponding to a velocity of the arm between the initial time and the current time (as well as acceleration information if the velocity is not constant, as indicated below), and an amount of time elapsed between the initial time and the current time. It may be noted that, as used herein, velocity information may also include information corresponding to a change of velocity over time or acceleration information. It may be noted that, in the illustrated embodiment, because the control rate is faster than the acquisition rate, at least one cycle of using prediction information may be employed before using perception information again, as a control event will occur at least once before current perception information is again available.

Further, a current predicted position may also be determined or estimated using the most recent previous predicted position, if the most recent previous predicted position is more recent than available perception information. In some embodiments, the arm may be controlled to move toward the target object using predicted position information for a first interval corresponding to the control rate, and using the perception information for a second interval corresponding to the acquisition rate. For example, the arm may be controlled over a series of first intervals (using prediction information) during at least one second interval (or time elapsed between availability of perception information).

At 418, the robotic system is controlled based on predicted position information (e.g., based on a position determined or estimated at 416). For example, in the illustrated embodiment, the arm is controlled to move closer to the target object. The arm may be controlled based on a difference between the position of the arm as estimated or predicted and a desired position corresponding to the target object.

At 420, it is determined if the target location has been achieved. If the target position has been achieved, the method 400 proceeds to 422. At 422, the task is performed (e.g., the lever is grasped and actuated). If the target location has not been achieved, the method 400 proceeds to 424. At 424, it is determined if current or up-to-date perception information is available or will be available before the next control event. If so, the method 400 proceeds to 408 for determination of a current position using perception information. If not, the method proceeds to 416 for determination of a current predicted or estimated position.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A robot system configured to manipulate a target object, the robot system comprising:
   an arm configured to move relative to the target object;
   a perception acquisition unit configured to acquire, at an acquisition rate, perception information corresponding to a position of the arm relative to the target object; and
   at least one processor configured to be operably coupled to the arm and the perception acquisition unit, the at least one processor configured to:
     control movement of the arm at a control rate based on the perception information,
     after movement of the arm, provide predicted position information representative of a predicted positioning of the arm using the perception information and control signal information wherein the predicted position information is determined at the control rate,
     subsequently control the arm using the predicted position information;
   wherein a ratio of the control rate to the acquisition rate is in the range of 10 to 100 and
   wherein the at least one processor is configured to control the arm using the predicted position information for a first interval corresponding to a control rate at which the arm is controlled, and to control the arm using the perception information for a second interval corresponding to an acquisition rate at which the perception information is obtained, wherein the control rate is at least one of faster than or unsynchronized with the perception information.

2. The robot system of claim 1, wherein the at least one processor is configured to control the arm over a series of plural first intervals during at least one second interval.

3. The robot system of claim 1, wherein the at least one processor is configured to, after controlling the arm using the predicted position information, acquire updated perception information and control the arm using the updated perception information.

4. The robot system of claim 3, wherein the at least one processor is configured to control the arm in a series of plural steps using the predicted position information before acquiring the updated perception information.

5. The robot system of claim 1, wherein the at least one processor determines if current perception information is available, and, uses the current perception information to control the arm if the current perception information is available, and, uses the predicted position information to control the arm if the current perception information is not available.

6. The robot system of claim 1, wherein the at least one processor is configured to determine a predicted position of the arm at a current time using a previous position of the arm at an initial time, velocity information corresponding to a velocity of the arm between the initial time and the current time, and an amount of time elapsed between the initial time and the current time.

7. The robot system of claim 1, wherein the perception acquisition unit is configured to be mounted to the arm and comprises at least one of a camera, stereo camera, or laser sensor.

8. A method for controlling a robot system, the method comprising:
   determining a target object toward which a robotic arm is to be directed;
   acquiring, with a perception acquisition unit, perception information corresponding to a position of the arm relative to the target object at an acquisition rate;
   controlling movement of the arm at a control rate based on the perception information;
   after movement of the arm, determining predicted position information representative of a predicted positioning of the arm using the perception information and control signal information;
   subsequently controlling the arm using the predicted position information;
   wherein a ratio of the control rate to the acquisition rate is in the range of 10 to 100; and
   wherein the method further comprises controlling the arm using the predicted position information for a first interval corresponding to a control rate at which the arm is controlled, and controlling the arm using the perception information for a second interval corresponding to an acquisition rate at which the perception information is obtained, wherein the control rate is at least one of faster than or unsynchronized with the perception information.

9. The method of claim 8, further comprising controlling the arm over a series of plural first intervals during at least one second interval.

10. The method of claim 8, further comprising, after controlling the arm using the predicted position information, acquiring updated perception information and controlling the arm using the updated perception information.

11. The method of claim 10, further comprising controlling the arm in a series of plural steps using the predicted position information before acquiring the updated perception information.

12. The method of claim 8, further comprising determining if current perception information is available, and, using the current perception information to control the arm if the current perception information is available, and, using the predicted position information to control the arm if the current perception information is not available.

13. The method of claim 8, wherein determining predicted position information representative of the predicted positioning of the arm comprises determining a predicted position of the arm at a current time using a previous position of the arm at an initial time, velocity information corresponding to a velocity of the arm between the initial time and the current time, and an amount of time elapsed between the initial time and the current time.

14. The method of claim 8, wherein the perception acquisition unit comprises at least one of a camera, stereo camera, or laser sensor.

15. A robot system configured to manipulate a target object, the robot system comprising:
  an arm configured to move relative to the target object;
  a perception acquisition unit configured to be mounted to the arm and to acquire, at an acquisition rate, perception information corresponding to a position of the arm relative to the target object; and
  at least one processor configured to be operably coupled to the arm and the perception acquisition unit, the at least one processor configured to:
    determine if current perception information is available, and
    use the current perception information to control the arm at a control rate if the current perception information is available,
    if current perception information is not available, determine predicted position information representative of a predicted positioning of the arm using the perception information and control signal information, and use the predicted position information to control the arm;
  wherein a ratio of the control rate to the acquisition rate is in the range of 10 to 100; and
  wherein the at least one processor is configured to control the arm using the predicted position information for a first interval corresponding to a control rate at which the arm is controlled, and to control the arm using the perception information for a second interval corresponding to an acquisition rate at which the perception information is obtained, wherein the control rate is at least one of faster than or unsynchronized with the perception information.

16. The robot system of claim 15, wherein the at least one processor is configured to determine a predicted position of the arm at a current time using a previous position of the arm at an initial time, velocity information corresponding to a velocity of the arm between the initial time and the current time, and an amount of time elapsed between the initial time and the current time.

17. The robot system of claim 15, wherein the perception acquisition unit comprises at least one of a camera, stereo camera, or laser sensor.

* * * * *